Sept. 9, 1924.

H. A. CAMPBELL

UNIVERSAL COOKING MACHINE

Filed April 9, 1923

INVENTOR.
HENRY A. CAMPBELL.
BY Dewey Strong
Townsend and Loftus
ATTORNEYS.

Sept. 9, 1924.
H. A. CAMPBELL
UNIVERSAL COOKING MACHINE
Filed April 9, 1923
1,507,883
3 Sheets-Sheet 2
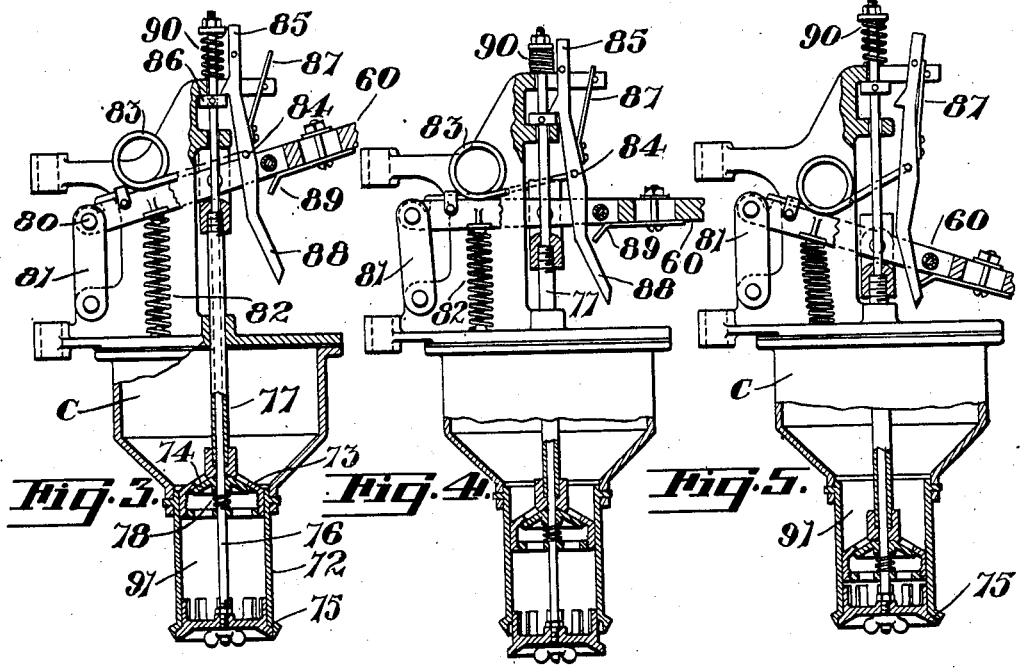
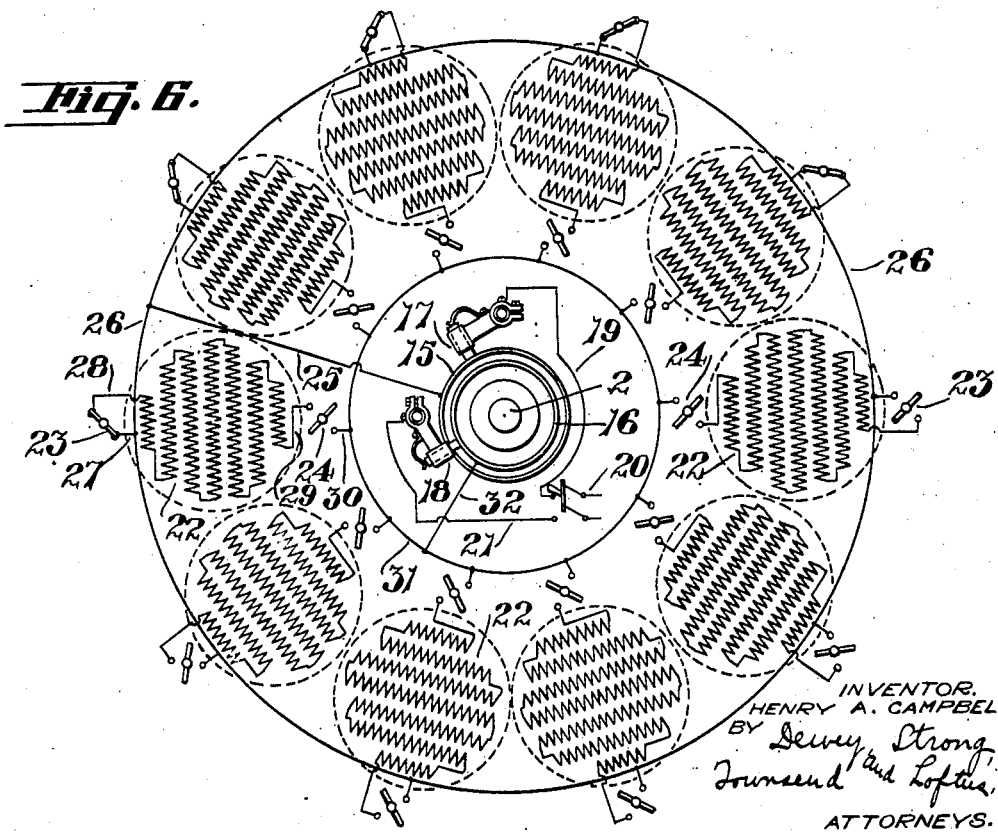
INVENTOR.
HENRY A. CAMPBELL
BY Dewey, Strong,
Townsend and Loftus,
ATTORNEYS.

Sept. 9, 1924.
H. A. CAMPBELL
UNIVERSAL COOKING MACHINE
Filed April 9, 1923
1,507,883
3 Sheets-Sheet 3
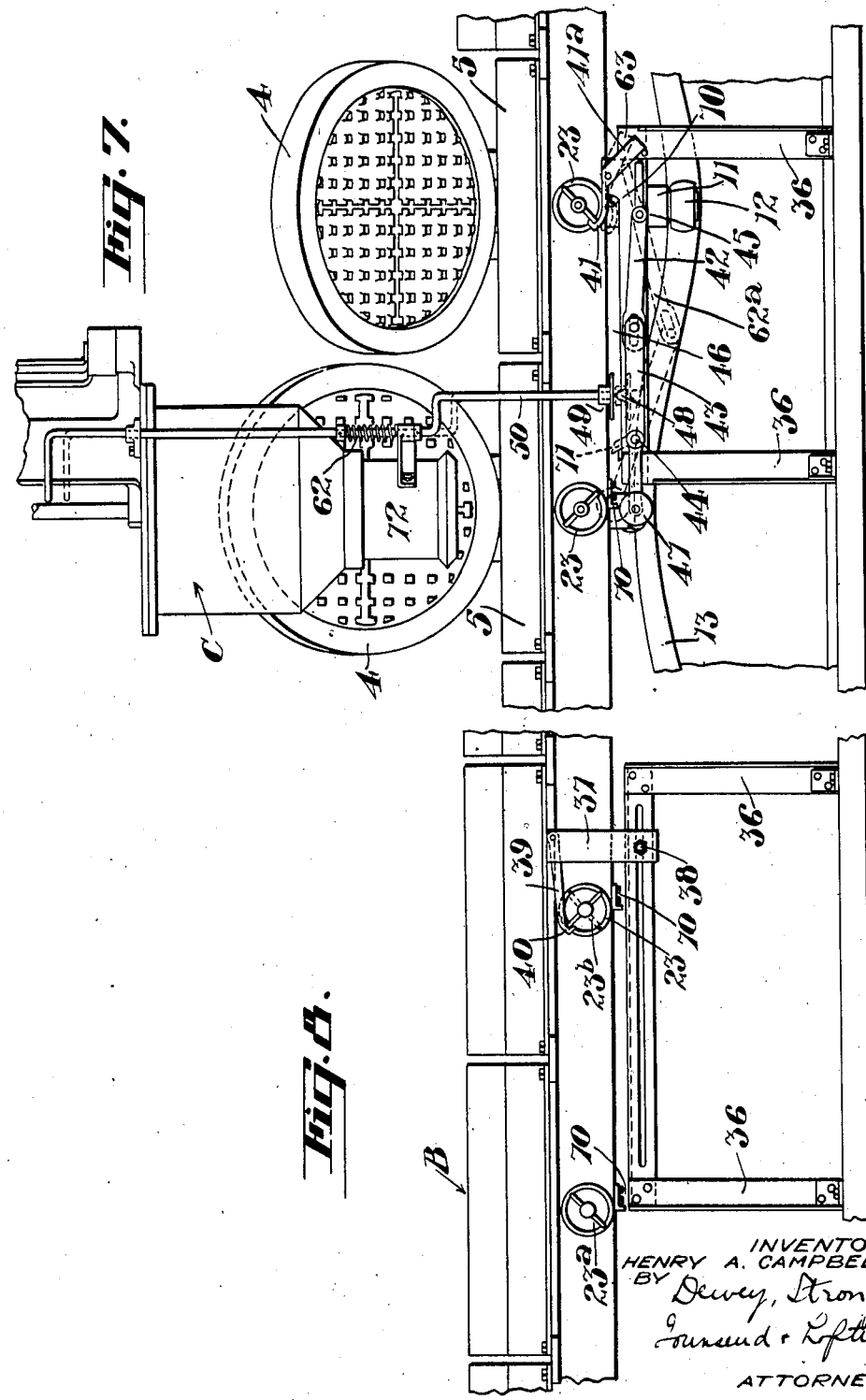
INVENTOR.
HENRY A. CAMPBELL.
BY Dewey, Strong,
Townsend & Loftus
ATTORNEYS.

Patented Sept. 9, 1924.

1,507,883

UNITED STATES PATENT OFFICE.

HENRY A. CAMPBELL, OF OAKLAND, CALIFORNIA.

UNIVERSAL COOKING MACHINE.

Application filed April 9, 1923. Serial No. 630,826.

*To all whom it may concern:*

Be it known that I, HENRY A. CAMPBELL, a citizen of the United States, residing at Oakland, county of Alameda, and State of California, have invented new and useful Improvements in a Universal Cooking Machine, of which the following is a specification.

This invention relates to a machine for cooking, baking, frying, etc., foods and other products.

The object of the present invention is to generally improve and simplify the construction and operation of machines of the character described; to provide a machine which may be employed for cooking, heating, baking, frying, etc., and which is particularly adapted for hotels, restaurants and the like, where a large output is required; a machine which may be efficiently operated whether running under maximum or minimum capacity; a machine which is electrically heated; a machine wherein predetermined temperatures are automatically maintained whether cooking or running empty; a machine provided with plural cooking units, any one or all of which may be rendered inoperative, and, furthermore, a machine provided with means for delivering measured quantities of batter or the like when baking, frying, etc. Other objects will hereinafter appear.

One form which my invention may assume is exemplified in the following description and illustrated in the accompanying drawings, in which—

Fig. 3 is a central, vertical section of the batter feeding mechanism.

Figs. 4 and 5 are similar sections showing the batter feeding mechanism in different positions.

Fig. 6 is a plan view showing the electric wiring diagram.

Fig. 7 is a partial side elevation of the machine, showing the operator's position, and also a portion of the automatic switch controlling mechanism.

Fig. 8 is a partial side elevation of the machine, showing another portion of the automatic switch actuating mechanism.

Figure 1:
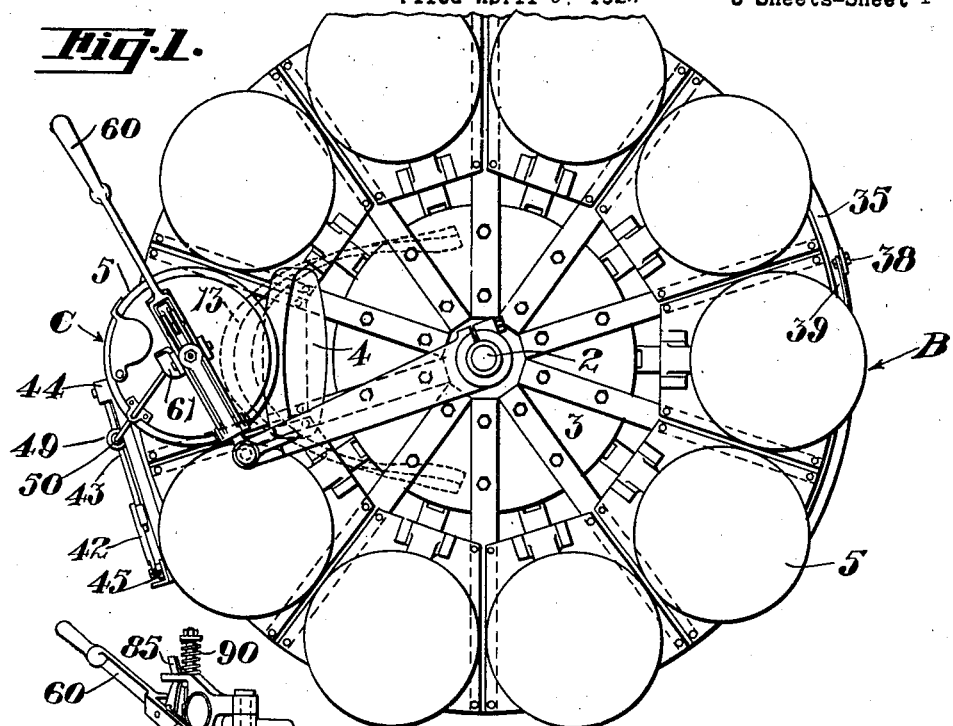
Fig. 1 is a plan view of the machine.
Figure 2:
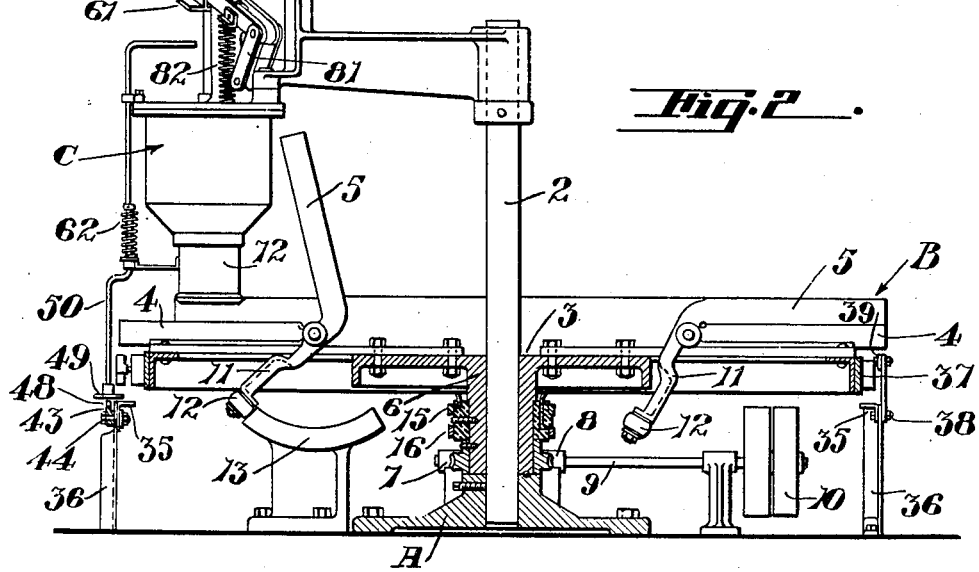
Fig. 2 is a central, vertical section taken on line 2—2, Fig. 1.

Referring to the drawings in detail, and particularly to Figs. 1 and 2, A indicates a base or pedestal in which is secured a central vertically disposed stationary shaft 2. Turnably mounted about the shaft is a table 3, and mounted thereon are a plurality of cooking units generally indicated at B, the cooking units illustrated in the present instance being waffle irons. These irons consist of two sections, a base section 4 and a cover section 5. Each section is electrically heated, as will hereinafter be described, and means are also employed for automatically raising and closing each cover section 5 to permit removal of the baked waffle, and to permit delivery of fresh batter. The table is continuously rotated when in operation and the heat applied to the waffle irons, and the time element involved in each rotation, are such that one baked waffle will be delivered from each iron during each revolution.

The table is provided with a centrally disposed, downwardly extending hub 6, in the lower end of which is mounted a worm gear 7. This gear meshes with a driving pinion 8 secured on a driving shaft 9, the shaft 9 being driven through means of pulleys 10 or the like.

By referring to Fig. 2, it will be noted that each cover section 5 is provided with a downwardly extending arm 11. Turnably mounted on the lower end of each arm is a roller 12, and fixed to the base section A or secured adjacent the same is a stationary cam 13, this cam being best illustrated in Figs. 1 and 2. Each arm 11 or, in other words, the roller 12 carried thereby, engages the cam during rotation of the table and the shape of the cam is such that each cover will be automatically raised and lowered once during each revolution. The dough or batter from which the waffles are made is contained in a hopper generally indicated at C, and means are employed for manually discharging predetermined quantities of the batter into each waffle iron as it passes the hopper C, as will hereinafter be described.

The waffle irons, as previously stated, are electrically heated and means are employed for maintaining a predetermined temperature in each iron when the machine is in operation; this being true whether dough is delivered to each waffle iron, or whether the waffle irons are running empty; that is, if the machine were employed in a hotel or restaurant, it is obvious that the output required would depend upon the demand. During the morning hours or, in other words, during the breakfast period, the demand is fairly great, but the number of waffles required decreases during the forenoon period and again increases during the luncheon period. Means are, therefore, provided for rendering certain waffle irons inoperative during the periods of least demand, and means are also provided for maintaining a certain number of irons in readiness or at a predetermined temperature in case of emergency; that is, a sudden rush might unexpectedly occur and if a certain number of waffle irons were maintained at a proper temperature, it is obvious that they would be ready for the immediate reception of the dough or batter.

The manner of supplying current to each waffle iron is perhaps best illustrated in Fig. 6. It may first of all be stated that the hub carries a pair of contact rings, as indicated at 15 and 16, and that a brush engages each ring as indicated at 17 and 18. The brush is connected through a wire 19 with one terminal of a main controlling switch 20, and the brush 18 is connected to the opposite terminal of the main switch by means of a wire 21. Therefore, if switch 20 were closed, current would be delivered to the contact rings 15 and 16 and then distributed from these rings to the respective waffle irons in the following manner:

Each section of the waffle iron contains a suitable number of heating elements or coils, such as indicated at 22, (see Fig. 6) and two switches are employed in connection with each heating element 22, as indicated at 23 and 24, there being one switch 24 for each waffle iron and one switch 23 for each waffle iron. The switches 24 are manually controlled, while the switches 23 are automatically controlled, as will hereinafter be described.

Assuming that contact ring 15 supplies the incoming current and that the ring 16 receives the outgoing current, the circuit through each iron will be as follows:

Current entering on wire 19 and passing through brush 17 enters contact ring 15. This ring rotates with the table and all connections made therewith may, therefore, be permanent. The current then leaves the contact ring 15 and passes out through a wire 25, which is connected with a common lead indicated at 26, this lead being known as the "positive lead." The current then enters the switch 23 through a wire 27 and if the switch were closed, it would pass therethrough as shown in Fig. 6, and out through a wire 28. This wire is connected with one terminal of the heating element 22 and the current, therefore, passes through the heating element 22 and out through a wire 29, which is connected with the switch 24. If this switch were closed, the current would pass through and out of the wire 30. This wire is connected to a common lead 31, known as the "negative or return lead," and this lead is in turn connected with the negative contact ring 16 through means of a wire 32. The current entering ring 16 passes out through brush 18 and wire 21 and the circuit is thus completed. The circuit described is identical in each iron and the description of one will, therefore, suffice.

Any iron may be thrown out of the circuit by opening the cooperating switch 24, and all irons will remain in the circuit as long as the switch 24 is closed. Means are, however, provided for automatically opening and closing the switches 23. For instance, if each waffle iron were employed, the switches 23 would permanently remain in closed position, permitting current to continuously flow through the heating elements 22, but if batter were not delivered to all of the irons and it is still desired to maintain the irons at proper temperature, switches 23 are automatically opened during a portion of each revolution and automatically closed during the remaining portion of each revolution. In other words, it is only necessary to apply a comparatively small amount of heat should it merely be desired to maintain the irons at working temperature, while a continuous application of heat is necessary when the irons are in constant operation or, in other words, when said irons are employed for baking or similar purposes. The automatic switch controlling mechanism is perhaps best illustrated in Figs. 7 and 8.

Surrounding the table is a stationary frame 35 supported by uprights or pedestals 36. Supported by the stationary frame on one side of the table is a bearing member 37. This bearing member is slidably mounted on the frame and as such may be circumferentially adjusted with relation to the outer edge or periphery of the table; the bearing member 37 being secured in adjusted position by means of a bolt or like locking mechanism indicated at 38. Pivotally mounted in the upper end of the bearing member is a tripping latch 39. This latch is hook-shaped on its outer end, as indicated at 40, and it serves the function of engaging the handles of the switches 23 and when so engaging them to throw them to on position, the trip latch 39 being so constructed that it will freely ride over the switch handles if they have already been thrown to on position. In Fig. 8, the switch indicated at 23ᵃ is shown in on position, while the switch indicated at 23 is shown in off position; therefore, as it rides in under the trip latch 39 during rotation of the table, it is obvious that the hook 40 will engage the switch handle and as such will throw the switch to on position or, in other words, the dotted line position indicated at 23ᵇ. However, if the switch 23 should already have been turned to on position, it can readily be seen that the hook will merely ride over the handle and the switch will not be affected, this being due to the fact that the trip latch 39 is pivotally supported in the bearing member 37 and as such will merely rise a slight distance and thereby not affect the switch. The trip latch 39 merely serves the function of throwing the switches 23 to on position. It furthermore serves the function of not disturbing the switches if they have already been thrown to on position. A second trip latch is illustrated in Fig. 7 and indicated by the numeral 41. The function of this trip latch is that of throwing the switch to off position. Means are, however, provided for depressing the trip latch 41 so that it will not affect the switches under certain conditions. The means illustrated is a pair of toggle links 42 and 43, each being pivotally supported on the stationary frame 35 at the points indicated at 44 and 45. The inner ends of the links 42 and 43 are pivotally connected and slotted, as at 46, and movement imparted to one link will, therefore, be similarly imparted to the opposite link. The trip latch 41 is provided with a counterweight 41$^a$ and to offset this counterweight, a second counterweight 47 is attached to the link 43. Also formed on the link 43 is an upwardly projecting link 48, and mounted in alignment therewith is a depressor plate 49, which is secured on the lower end of a rod 50, which is actuated by the batter delivering hopper or mechanism connected therewith and hereinafter to be described.

The trip lever 41, as already stated, serves the function of throwing the switches to off position, but it is automatically depressed so as not to affect the switches when batter is delivered to the waffle irons.

The side of the table illustrated in Fig. 7, will hereinafter be described as the operator's side or station, as the batter delivering mechanism is manually operated. The cam 13 by which the covers of the waffle irons are automatically raised and closed is also placed in alignment with this station and it is, therefore, obvious that the covers will be automatically raised as the irons approach the batter delivering mechanism. Furthermore, that they remain open when in alignment therewith and they are automatically closed when leaving the same. During the open period of the waffle iron covers, the operator removes the baked waffles and thereafter actuates the batter delivering mechanism. When a waffle is removed from one of the irons and it is desired to refill the iron with batter, the operator pulls downwardly on the main operating lever indicated at 60, (see Figs. 1, 2, 3, 4 and 5.) An angle bracket 61 is secured to one side of the main operating lever and this angle bracket engages the upper end of the rod 50. This rod is normally held in a raised or an elevated position by means of a spring 62, but this spring is compressed when rod 50 is depressed by means of the main operating lever 60. Downward movement of the rod 50 causes the pusher plate 49 to engage the lug 48 and links 42 and 43 are, therefore, depressed to assume the dotted line position indicated at 62$^a$ in Fig. 7. The outer end of the link 42 will during this movement engage the counterweight 41$^a$ on the trip latch 41 and raise the same to the dotted line position shown at 63. The trip latch 41 is, therefore, depressed and the switch 23 aligning therewith will not be disturbed. It should be remembered that the function of the trip latch 39 is that of turning all the switches 23 to on position, and that all the switches 23 will reach the trip latch 41 in on position; therefore, if batter should be delivered to a waffle iron when trip latch 41 is reached, the switches will continue to remain in on position and the waffle will be baked, but should no batter be delivered to the waffle iron, trip latch 41 will not be depressed and it will, therefore, engage the switch handle and turn it to off position. In other words, means have been employed for automatically maintaining the current on the irons to which batter is delivered, and means have also been employed for automatically turning off the switches when no batter is delivered. It can, therefore, be seen that the current is permitted to flow through each iron during that period of rotation or the time period required for the table to turn from the trip latch 39 to the trip latch 41, this time period being sufficient to maintain the temperature of the irons in condition to receive batter if the demand increases. Again, if the demand should be fairly small, it is possible that a group of irons, or every other iron, may be rendered entirely inoperative by merely opening the manually operated switches 24.

It was previously stated that the links 42 and 43 were counterweighted by means of the counterweights 41$^a$ and 47. This is done for the purpose of balancing the links so that they will remain in a depressed position once they are depressed or conversely remain in a raised position if not depressed. If one waffle iron has been filled with batter and the next waffle iron approaching is being maintained at working temperature, but it is not desired to fill the same with batter, it is obvious that the switch 23 connected therewith should be turned off. It is furthermore obvious that it would not be turned off as the links 42 and 43 would assume a depressed position or the dotted line position indicated at 62ᵃ. Means must, therefore, be employed for automatically returning the links to raised position or, in other words, the trip latch 41 to operating position. This is accomplished by forming lugs 70 on the underside of the table, one lug for each switch 23, and similarly forming a lug or finger 71 on the pivotal end 44 of the link 43. The lug or finger 71 will assume a raised position when the links 42 and 43 are depressed, and it will, therefore, be engaged by the lug 70 of the following waffle iron. This engagement will cause the links to assume a raised position and the switch latch 41 an operating position, and the switch 23 on the following iron will, therefore, be turned to off position. It might be assumed that the links 42 and 43 could be so counterweighted that they would automatically return to raised position when rod 50 is raised, but this would not be desirable as practice has determined that it is best to leave the links and the trip latch 41 in depressed position when the machine is operating at maximum capacity.

The batter delivering mechanism is perhaps best illustrated in Figs. 1, 2, 3, 4 and 5. It consists of a hopper C in which the batter is placed. The lower end of the hopper is provided with a cylindrical extension 72 in which are mounted three valves such as indicated at 73, 74 and 75. The valve 73 will hereinafter be referred to as a combined measuring and discharging valve; the valve 74 as a check valve, and the valve 75 as an outlet valve. The valve 75 is secured on the lower end of a rod 76, while the valve 73 is secured on the lower end of a tubular rod or sleeve 77 which surrounds the rod 76. The check valve 74 is supported by the valve 73 and is normally held in engagement therewith by means of a spring of light tension as indicated at 78; that is, the spring is interposed between the valve 74 and the hub which is carried by arms forming a part of the valve 73. The tubular rod 77 is secured to a forked head member 79, the connection being formed by threading the upper end of the tube into the forked member; this connection being important as it permits adjustment of the tubular member with relation to the forked member.

The main operating lever 60 is pivotally supported at its inner end, as at 80, between a pair of links 81 and a pair of coil springs 82 is interposed between the pivotal end and the forked member 79 to normally maintain the operating lever in a raised position. The lever 60 is pivotally connected to the forked member 79 and positive movement is thus imparted to the tubular rod 77 and the valve 73 when the lever 60 is raised or lowered. Movement is also imparted to the rod 76 and the valve 75 through means of the lever 60, but no positive connection is formed between the same. Movement is imparted as follows:

Secured on the inner end of the lever 60 is a pair of spring arms 83, and secured between the forward ends of the spring arms and pivotally mounted thereon as at 84 is a latch 85. This latch normally engages a collar 86 secured near the upper end of the rod 76 and as the spring arms 83 move in unison with the lever 60 a downward pull will be exerted on the latch 85, thereby transmitting a downward movement to the rod 76 as the collar 86 is secured on the rod. The latch is maintained in engagement with the collar 86 through means of a flat spring 87, but means are employed for throwing the latch out of engagement with the collar when a predetermined movement has been imparted to the rod 76 and the valve 75. This is accomplished by forming a cam or bend on the lower end of the latch as indicated at 88. This bend or cam is engaged by an adjustable finger 89 secured to the operating lever. When the finger 89 engages the cam end of the latch, pivotal movement is imparted thereto and collar 86 is released. The rod 76, together with valve 75, is then automatically returned to closed position, this being accomplished by the tension exerted through a spring 90 engaging the upper end of the rod, as shown in Figs. 3, 4 and 5.

The operation will be as follows:

If the hopper C has been filled with batter, dough or like material, and also assuming that the chamber 91 formed between the valves 73 and 75 has likewise been filled with batter, and it is desired to discharge the same, it will only be necessary to pull downwardly on the main operating lever 60. A downward pull on this lever will cause outlet valve 75 to assume the open position shown in Fig. 4, and it will at the same time cause valve 73 to move downwardly in the cylindrical extension and thereby forcibly discharge the batter, a forcible discharge being obtained by the positive movement imparted to the valve 73 and being also due to the fact that the check valve 75 automatically closes during this movement. When the lever 60 has been moved downwardly a predetermined distance, finger 89 engages the lower end of the latch 85 and this will, therefore, be tripped as shown in Fig. 5. Collar 86 is thus released and the valve 75 is automatically closed, due to the upward pull exerted by the spring 90. The operating lever is now raised or it may be released as it will be automatically raised by the tension of the springs 82 which are compression springs. During this raising movement the valve 73 is returned to the position shown in Fig. 3. The check valve opens during this upward movement and batter is thus admitted to chamber 91 through the openings formed in the valve 73 and the check valve again automatically closes when chamber 91 has been filled. The latch 85 returns to normal or engageable position with relation to collar 86 when the lever is returned as the latch is pivotally mounted on the arms 83 and it is forced inwardly by means of the spring 87.

The capacity of the chamber 91 may be increased or decreased by raising or lowering the valve 73, this being accomplished by raising or lowering the tubular rod 77 with relation to the forked member 79, the threaded connection between the forked member and the rod permitting this adjustment. A predetermined or variable quantity of batter may thus be discharged with each operation and waffles, hot-cakes, or the like, of any desired size, may be obtained.

From the foregoing description it can first be seen that the table continuously rotates when the machine is in operation; secondly, that the covers of the waffle irons are automatically raised when they approach the batter delivering mechanism; that they remain raised while in alignment with the same and that they are automatically closed after leaving the same; thirdly, that means are employed for cutting off the current to any or all of the irons if desired; this being accomplished by opening or closing the manually operated switches 24; fourth, that means are employed for automatically maintaining a continuous flow of current through the irons if batter has been delivered thereto once during each revolution; fifth, that means are employed for automatically cutting off the current or flow through one or more of the irons if no batter has been delivered, and if it is merely desired to maintain the irons at working temperature; and sixth, that predetermined quantities of batter may be delivered by adjusting the position of the valve 73. Due to the manual and automatic control of the current flow through the irons, it is obvious that the machine may be efficiently operated whether running at maximum or minimum capacity, and furthermore that a certain number of irons may be maintained at working temperature even though they are not in use and economically maintained at this temperature as the current is only permitted to flow through the irons which are not in operation for a short period during each revolution. Any sudden demand on the machine may thus be readily taken care of. In the present instance I have illustrated the machine as employed for waffle baking, but I wish it understood that it may be employed for cooking, frying, heating, etc. For instance, by changing the shape of the irons it is possible to bake cakes, to fry hot-cakes, to make gems, muffins, or to handle other food products, this being accomplished by increasing or decreasing the number of heating elements employed in each iron and by changing the interior shape of the same, and the capacity of the machine may further be increased or decreased by increasing or decreasing the temperature, and by increasing or decreasing the turning movement thereof.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is:—

1. A machine of the character described, comprising a table, means for imparting a rotary movement thereto, a plurality of cooking units carried by the table, a cover for each unit, and means for automatically opening and closing the covers during movement of the table.

2. A machine of the character described, comprising a table, means for imparting a rotary movement thereto, a plurality of cooking units carried by the table, a cover for each unit, means for automatically opening and closing the covers during movement of the table, and means for delivering a predetermined quantity of batter to each cooking unit when the covers are opened.

3. A machine of the character described, comprising a table, means for imparting a rotary movement thereto, a plurality of cooking units carried by the table, a cover for each unit, means for automatically opening and closing the covers during movement of the table, means for electrically heating each unit, and means for automatically maintaining a predetermined temperature when cooking.

4. A machine of the character described, comprising a table, means for imparting a rotary movement thereto, a plurality of electrically heated cooking units carried by the table, and means for maintaining a predetermined temperature in each unit.

5. A machine of the character described, comprising a table, means for imparting a rotary movement thereto, a plurality of electrically heated cooking units carried by the table, means for maintaining a predetermined temperature in each unit when cooking, and means for maintaining a predetermined temperature in each unit when not cooking.

6. A machine of the character described, comprising a table, means for imparting a rotary movement thereto, a plurality of electrically heated cooking units carried by the table, means for maintaining a predetermined temperature in each unit, and manually controlled means for turning off an electric current supply to any one or all of the cooking units.

7. A machine of the character described, comprising a table, means for imparting a rotary movement to the same, a plurality of electrically heated cooking units carried by the table, and an automatically actuated switch in the circuit of each cooking unit, said switch adapted to maintain a predetermined temperature in the unit when cooking, and also adapted to automatically maintain a predetermined temperature when not employed for cooking.

8. A machine of the character described, comprising a table, means for imparting a rotary movement to the same, a plurality of electrically heated cooking units carried by the table, a switch mounted in the electric circuit of each cooking unit, means engageable with the switch for turning it to an on position, and other means engageable with the switch for turning the same to off position.

9. A machine of the character described, comprising a table, means for imparting a rotary movement to the same, a plurality of electrically heated cooking units carried by the table, a switch mounted in the electric circuit of each cooking unit, means engageable with the switch for turning it to an on position, other means engageable with the switch for turning the same to off position, and means for rendering said last named means inoperative.

10. A machine of the character described, comprising a table, means for imparting a rotary movement to the same, a plurality of electrically heated cooking units carried by the table, a switch mounted in the electric circuit of each cooking unit, means engageable with the switch for turning it to an on position, other means engageable with the switch for turning the same to off position, and means for adjusting the position of the means whereby the switch is turned to on position.

11. A machine of the character described, comprising a table, means for imparting a rotary movement to the same, a plurality of electrically heated cooking units carried by the table, a switch mounted in the electric circuit of each cooking unit, means engageable with the switch for turning it to an on position, other means engageable with the switch for turning the same to off position, a batter supplying mechanism, manually operated means for actuating the batter supplying mechanism to discharge a quantity of batter therefrom, and means actuated by the batter supplying mechanism for rendering the last named switch actuating means inoperative when batter is discharged.

12. A machine of the character described, comprising a table, means for imparting rotary movement thereto, a plurality of electrically heated cooking units carried by the table, means for supplying an electric current to each unit, means for maintaining a current flow through each unit for a predetermined period if the cooking units are running empty to maintain a predetermined temperature in the empty cooking units, and means for automatically maintaining a continuous flow of current through the units when cooking.

13. The combination with a machine of the character described, of a batter supplying mechanism, said mechanism comprising a hopper adapted to receive batter, a discharging mechanism cooperating with the hopper, and means for varying the capacity of said discharging mechanism.

14. The combination with a machine of the character described, of a batter supplying mechanism, said mechanism comprising a hopper adapted to receive batter, a combined measuring and discharging valve cooperating with the hopper, an outlet valve cooperating with the first named valve, and means for operating the above valves in unison.

15. The combination with a machine of the character described, of a batter supplying mechanism, said mechanism comprising a hopper adapted to receive batter, a combined measuring and discharge valve cooperating with the hopper, an outlet valve cooperating with the first named valve, means for adjusting the position of the first named valve with relation to the outlet valve to vary the amount of batter discharged, and means for operating the valves in unison.

16. The combination with a machine of the character described, of a batter discharging mechanism, said mechanism comprising a hopper for the reception of batter, a cylindrical extension on the lower end of the hopper, an outlet valve forming a closure for the lower end of the cylindrical extension, a combined measuring and discharging valve disposed in the cylindrical extension above the outlet valve, means for operating both valves to discharge batter, and means for adjusting the position of the combined measuring and discharging valve with relation to the outlet valve to vary the amount of batter discharged.

17. The combination with a machine of the character described, of a batter discharging mechanism, said mechanism comprising a hopper for the reception of batter, a cylindrical extension on the lower end of the hopper, an outlet valve forming a closure for the lower end of the cylindrical extension, a combined measuring and discharging valve disposed in the cylindrical extension above the outlet valve, a tubular rod supporting the last named valve, a rod secured to the outlet valve and extending through the tubular rod, means for adjusting the position of the combined measuring and discharging valve with relation to the outlet valve to vary the amount of batter discharged, and means for imparting a reciprocal movement to the rods in unison and independent of each other.

HENRY A. CAMPBELL.